US008971240B2

(12) United States Patent
Shah

(10) Patent No.: US 8,971,240 B2
(45) Date of Patent: Mar. 3, 2015

(54) METHOD AND APPARATUS FOR PERFORMING RADIO LINK TIMER MANAGEMENT IN A WIRELESS COMMUNICATIONS NETWORK

(75) Inventor: Dipesh H. Shah, Fermont, CA (US)

(73) Assignee: AT&T Mobility II LLC, Atlanta, GA (US)

( * ) Notice: Subject to any disclaimer, the term of this patent is extended or adjusted under 35 U.S.C. 154(b) by 1123 days.

(21) Appl. No.: 11/005,670

(22) Filed: Dec. 6, 2004

(65) Prior Publication Data

US 2006/0120318 A1 Jun. 8, 2006

(51) Int. Cl.
*H04W 4/00* (2009.01)
*H04W 76/06* (2009.01)

(52) U.S. Cl.
CPC ..................... *H04W 76/06* (2013.01)
USPC ............................ 370/328; 370/332; 455/423

(58) Field of Classification Search
USPC ............ 370/252, 328, 332; 455/522, 69, 421, 455/423, 67.11, 443
See application file for complete search history.

(56) References Cited

U.S. PATENT DOCUMENTS

| | | | |
|---|---|---|---|
| 7,164,710 B2 * | 1/2007 | Komaili et al. ............... | 375/229 |
| 2002/0065071 A1 * | 5/2002 | Hunzinger .................... | 455/421 |
| 2002/0198014 A1 * | 12/2002 | Miyamoto et al. ............ | 455/522 |
| 2004/0203727 A1 * | 10/2004 | Abiri et al. .................... | 455/423 |
| 2005/0070322 A1 * | 3/2005 | Tayloe et al. ................. | 455/522 |
| 2006/0120318 A1 * | 6/2006 | Shah ............................. | 370/328 |

* cited by examiner

*Primary Examiner* — Nay A Maung
*Assistant Examiner* — Angelica M Perez
(74) *Attorney, Agent, or Firm* — Hartman & Citrin LLC

(57) ABSTRACT

A method and apparatus for performing radio link timer (RLT) management in a wireless network. The method and apparatus examine the frame error rates (FERS) associated with decoded speech or data frames and determine how many speech or data frames are unacceptable. If the number of speech or data frames that is unacceptable exceeds a preset threshold value, a determination is made that the call should be released. This process is performed in both the uplink and downlink directions and determinations as to whether the call should be released are made by the mobile station (MS), the base station system (BSS) or mobile switching center (MSC) for the downlink direction and by the base station system (BSS) for the uplink direction. If a determination is made that the number of unacceptable speech or data frames exceeds the preset threshold, the call is released.

20 Claims, 4 Drawing Sheets

METHOD AND APPARATUS FOR PERFORMING RADIO LINK TIMER MANAGEMENT IN A WIRELESS COMMUNICATIONS NETWORK

BACKGROUND OF THE INVENTION

1. Field of Invention

The present invention relates to wireless communications, and more particularly, to managing the radio link timer in a wireless communications network to control when a call between a mobile station and a base station should be released due to radio link failure.

2. Description of Related Art

When a call is in progress in a wireless network, a radio link timer (RLT) in the mobile station (MS) and a RLT at the base station system (BSS) control when calls between the MS and BS are to be released because of poor radio quality and/or radio link failure. When the RLT at either the MS or BS times out, the call is released. Both the MS and the BS have RLT management logic that monitors the radio link. In one common implementation, the RLT management logic monitors the number of control channel (CCH) frames that have been successfully decoded during a time interval and makes a determination as to whether the call should be dropped based on the number of CCH frames that have been successfully decoded. In global system for mobile communications (GSM) wireless networks, the CCH frames that govern RLT management are called Slow Associated Dedicated Control Channel (SACCH) frames. The SACCH channel carries call signaling information such as, for example, connection management information, mobility management information and radio resource information.

Both speech frames and SACCH frames are transmitted between the MS and the BS during a call. Decoding circuitry of the MS decodes the frames and passes the decoded information on to call processing function of the MS. In GSM wireless networks, the RLT management logic of the MS includes a counter that is decremented by 1 when the MS decoding circuitry is unable to successfully decode a SACCH frame and increments the counter by 2 (up to a maximum value equal to the initial setting of the counter) when the MS decoding circuitry is able to successfully decode a SACCH frame. The initial value of the counter can be configured by the wireless network parameters. When the counter is decremented to 0, the MS releases the call. The counter cannot be incremented to a value that is greater than its initial value. This particular RLT incrementing and decrementing algorithm results in a call being released when more than 66.66% of the SACCH frames are unable to be successfully decoded.

At the BSS, which typically includes the base transceiver station (BTS) and the base station controller (BSC), the BSC typically controls RLT management. The RLT management logic at the BSC includes a counter that starts at some initial value, such as 24, for example. The RLT of the BSC decrements the counter by 1 when the decoding circuitry of the BS is unable to successfully decode a SACCH frame. The RLT increments the counter by 2 (up to a maximum value equal to the initial setting of the counter) when the BSC decoding circuitry is able to successfully decode a SACCH frame. When the counter is decremented to 0, the BS releases the call. The counter cannot be incremented to a value greater than its initial setting, which is generally specified by configurable wireless network parameters. Like the MS, the incrementing and decrementing algorithm performed by the BSC results in a call being released when the BSC is unable to successfully decode more than 66.66% of the SACCH frames.

In GSM systems, speech frames are encoded by a Half Rate, Full Rate, Enhanced Full Rate (EFR) or Adaptive Multi Rate (AMR) vocoder. The EFR vocoder is governed by a particular standard that requires sampling speech at a bit rate of 12.2 kilobits per second (kbps). Once the speech has been sampled, error bits are added for error coding. Encoded speech bits and encoded SACCH bits are combined into the same frame, and the encoding of the SACCH frame bits is comparable to the encoding of the speech bits. Consequently, if more than 66.6% of the SACCH frames cannot be successfully decoded, it is quite likely that the voice quality has degraded to the point that the call should be released. However, for EFR vocoders, it is also possible that while a sufficient number of SACCH frames are able to be successfully decoded to prevent the RLT from timing out, voice quality is unintelligible. Therefore, with EFR vocoders, calls are not always released when they should be released.

Like the EFR vocoder, the more recently implemented AMR vocoder is governed by a particular standard that calls for sampling speech at anywhere from 12.2 kbps down to 4.75 kbps, depending on whether less error correction bits or more error correction bits, respectively, are added to the frames. When signal quality is very good, the AMR vocoder samples at the higher sampling rate of 12.2 kbps, but as signal quality degrades, more error correction bits are added to the frames and less speech bits are included. When signal quality is relatively weak, the AMR vocoder could sample speech at the lower rate of 4.75 kbps, and thus add a larger number of error correction bits to the frames. Encoded SACCH bits are added to the frames on top of the encoded speech bits.

With AMR, SACCH encoding does not change as speech sampling and encoding adapt to the measured signal quality. Nevertheless, the same RLT algorithm that is used for EFR is also used for AMR. When the AMR vocoder is sampling speech at the lower rate, such as, for example, 4.75 kbps, it is possible that more than 66.6% of SACCH frames are unable to be successfully decoded, but that speech can be successfully decoded at the lower rate speech codecs, which means that voice quality is satisfactory. Nevertheless, when more than 66.6% of the SACCH frames are unable to be successfully decoded, the RLT will time out and the call will be released even though voice quality is intelligible.

Accordingly, a need exists for a method and apparatus for performing RLT management that prevent calls from being released by a radio link timer management module when voice or data quality is intelligible and that ensure that calls are released when voice or data quality is unintelligible.

SUMMARY OF THE INVENTION

A method and apparatus are provided for performing radio link timer (RLT) management in a wireless network. The method and apparatus look at the frame error rate (FER) associated with decoded speech or data frames and determine how many speech or data frames are unacceptable. If the number of speech or data frames that are unacceptable exceeds a preset threshold value, a determination is made that the call should be released. This process is performed in both the uplink and downlink directions and determinations as to whether the call should be released are typically made by the mobile station (MS) for the downlink direction and by the base station system (BSS) for the uplink direction. In the case of the MS being unable to successfully decode a sufficient number of acceptable speech or data frames, the MS may make the determination that the call is to be released and then cause the call to be released. Alternatively, the MS may report unacceptable speech or data frames to the BSS, in which case the BSS will release the call when it determines that the number of unacceptable speech frames has exceeded a preset threshold. In all cases, when either the MS or BSS determines that the number of unacceptable speech or data frames exceeds the preset threshold, the call is released. The RLTs of the MS and BSS preferably each comprise first logic configured to measure frame error rate (FER) information relating to a number of speech or data frames that the respective decoder of the MS or BSS was incapable of successfully decoding, and second logic configured to make a determination as to whether or not a call should be released based on the FER information. In the case where the MS simply reports unacceptable speech or data frames to the BSS, the MS may not have the second logic because the BSS is making the determination as to whether or not the call should be released based on the FER information reported to the BSS by the MSS.

The BSS typically includes a base transceiver station (BTS) and a base station controller (BSC). Typically, the first and second logic of the BSS are part of the BSC, although they may instead be part of the BTS. Alternatively, the first and second logic functions performed in the uplink direction may be implemented by logic of a mobile switching center (MSC). In the downlink direction, the first and second logic typically are both part of the MS transceiver. However, the invention is not limited with respect to the locations at which the fist and second logic functions are performed or with respect to the manner in which these functions are physically implemented.

The method of the present invention for determining whether a call is to be released by a MS or BSS comprises decoding a plurality of consecutive speech or data frames associated with a call in which the MS and BS are participating, determining a FER associated with the speech or data frames, and, based on the FER associated with the speech or data frames, determining whether to release the call.

The present invention also provides code for determining whether a call between an MS and BS is to be released based on the FER associated with the decoded speech or data frames. The code preferably is the same at both the BSS (or MSC) and MS and includes a first code segment for decoding a plurality of consecutive speech or data frames associated with a call in which the BSS and MS are participating, a second code segment for determining a FER associated with the speech or data frames, and a third code segment for determining, based on the FER associated with the speech or data frames, whether to release the call. These and other features and advantages of the present invention will become apparent from the following description, drawings and claims.

DETAILED DESCRIPTION OF THE EXEMPLARY EMBODIMENTS

Figure 1:
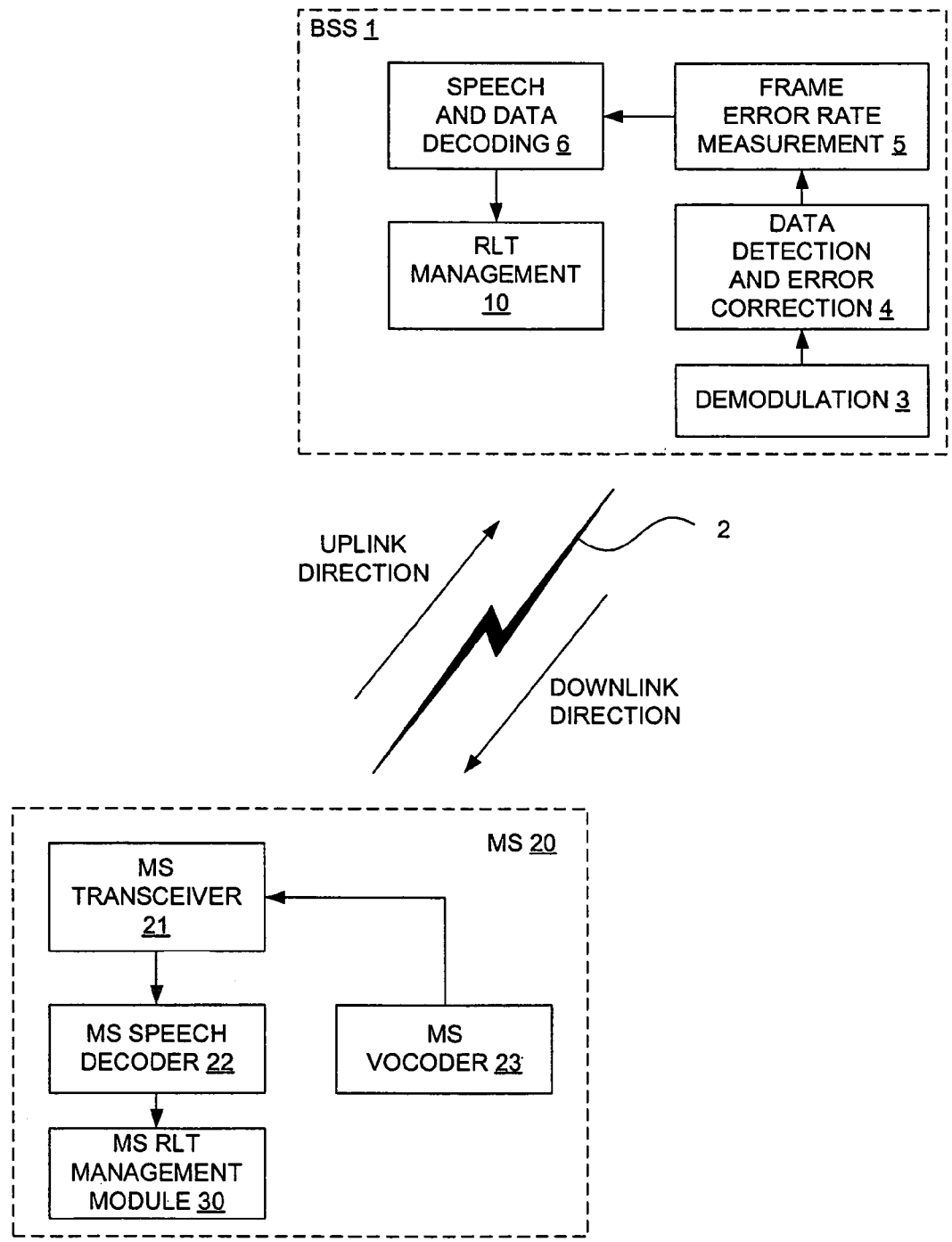
FIG. 1 is a block diagram of a wireless network that incorporates the RLT of the present invention.

In accordance with the present invention, RLT management is based on voice or data quality, not on whether a sufficient number of SACCH frames are able to be successfully decoded. If speech is being transmitted, the present invention determines whether a call should be released based on the frame error rate (FER) associated with the speech frames. If data is being transmitted, the present invention determines whether a call should be released based on the FER associated with the data frames. The manner in which the present invention performs RLT management will now be described with reference to the wireless network block diagram shown in FIG. 1.

A BSS 1 communicates with an MS 20 via a wireless radio communication link 2. For ease of discussion and to avoid duplicity, the present invention will only be described with reference to speech frames. However, it should be noted that the present invention applies equally and with equal advantage to data frames. The BSS 1 includes demodulation circuitry 3 that demodulates the received signal, data detection and error correction circuitry 4 that detects the data and corrects bit errors, FER measurement circuitry 5 that measures the FERs associated with the received signal, a speech decoder 6 that performs speech decoding and an RLT management module 10, which performs the tasks of the present invention to determine whether a call should be released. The components 3-64 are typical components of a BSS and perform typical BTS and BSC operations. As indicated above, RLT management tasks of the invention may be performed in the BTS or BSC portions of the BSS 1 or they may be performed in the MSC.

The BSS 1 wirelessly transmits and receives frames to and from the MS 20. These frames include speech bits and control channel bits, such as SACCH bits. The BSS 1 decodes all the bits of received frames, applies error correction and determines whether each frame was successfully decoded. The number of frames successfully decoded as well as a total of the number of received frames are passed along to the RLT management module 10, which comprises logic configured to receive the FER information and logic configured to determine, based on the FER information, whether or not the call should be released. The manner in which the RLT management module 10 makes this determination will be described below with reference to the flow charts shown in FIGS. 2 and 4.

The MS 20 includes a transceiver 21, a MS speech decoder 22, a MS vocoder 23 and a MS RLT module 30. The MS transceiver 21 and MS speech decoder 22 are typical components of a MS and perform typical transceiver and decoder operations. The MS vocoder 23 is also a typical component of the MS and may be, for example, an EFR or AMR vocoder.

In the uplink direction, the BSS 1 decodes speech frames received by the BSS 1 and determines FER associated with the speech frames. The BS RLT management module 10 receives the FER information and determines whether or not to release the call based on the FER information and certain specified parameters, as described below with reference to FIGS. 2 and 4. In the downlink direction, the MS decoder 22 decodes speech frames received by the MS 20 and determines a FER associated with the received speech frames. The MS RLT management module 30 comprises logic configured to receive the FER information and logic configured to determine whether or not to release the call based on the FER information and certain specified parameters, as described below in detail with reference to FIGS. 2 and 3.

Figure 2:
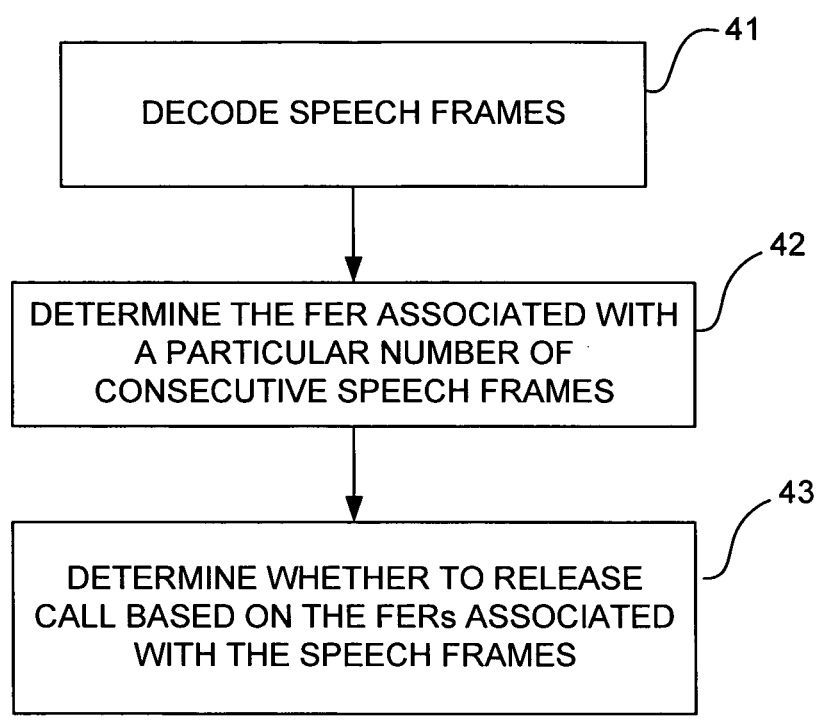
FIG. 2 is a flow chart of the method of the present invention for determining whether a call should be released based on call quality.

FIG. 2 is a flow chart of the method of the present invention performed by the RLT of the present invention. The method performed by the BS RLT management module 10 preferably is identical to the method performed by the MS RT management module 30, although certain parameters used in the modules 10 and 30 may be different. For ease of discussion and illustration, the method will only be described with reference to frames received by the MS 20 in the downlink direction since the methods in the uplink and downlink directions are essentially the same.

Frames received by the MS 20 are decoded by the MS transceiver 21, as indicated by block 41. The transceiver 21 determines a FER associated with decoded speech frames for a particular number of speech frames, as indicated by block 42. The MS RLT management module 30 determines whether to release the call based on the determined FER, as indicated by block 43. Although the RLT management module 30 is shown in FIG. 1 as being physically separate from the MS transceiver 21, this is merely for illustrative purposes. The components 22, 23 and 30 shown in FIG. 1 are typically all part of the MS transceiver 21, although this is not necessarily the case. It should also be noted that the steps represented by blocks 42 and 43 may be performed in a variety of ways. The invention is not limited to performing these steps in any particular manner.

Figure 3:
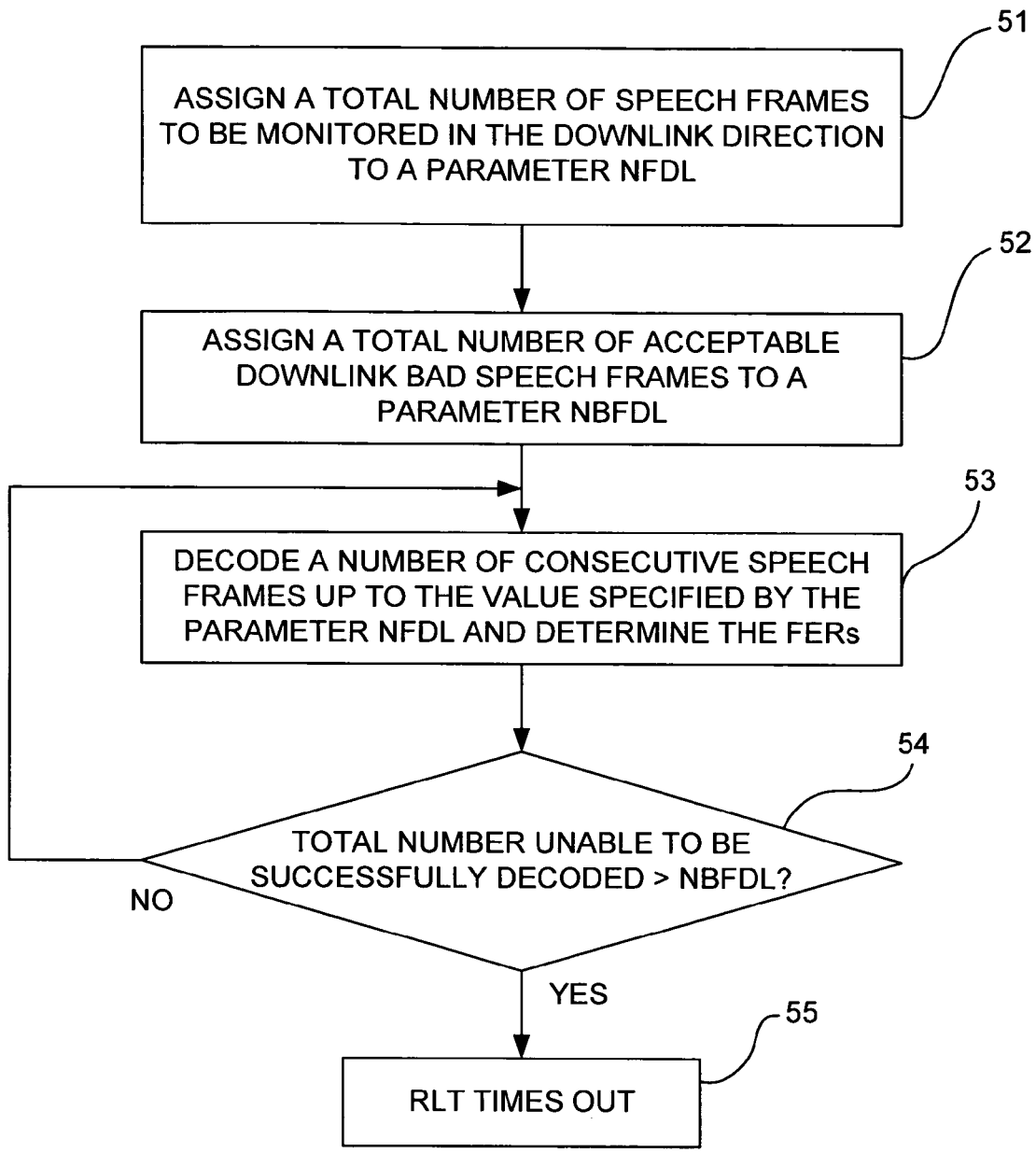
FIG. 3 is a flow chart of the method of the present invention in accordance with the preferred embodiment for monitoring frames in the downlink direction to determine whether a call should be released by the MS.

FIG. 3 illustrates a flow chart of the method of the present invention in accordance with the preferred embodiment. For the downlink direction, a total number of speech frames to be monitored in the downlink direction is assigned to a parameter, as indicated by block 51. This parameter will be called NFDL. A total number of acceptable downlink bad speech frames is assigned to a parameter, as indicated by block 52. This parameter will be called NBFDL. A number of consecutive speech frames equal to the value of the parameterl to the value of the parameter "NFDL" are then decoded, as indicated by block 53.

Based on the FERs, a determination is then made as to whether the total number of speech frames that were unable to be successfully decoded exceeds the value of the parameter NBFDL, as indicated by block 54. Typically, the determination is based on a certain number of the most recently received consecutive frames, i.e., on a first-in first-out (FIFO) basis or sliding window basis. For example, the RLT management module may determine the FER every NFDL interval or every one frame interval. In each case, the RLT module preferably examines the most recently received "NFDL" frames and the associated successful decoding of the frames to determine the FER.

If a determination is made at block 54 that the total number of speech frames that were unable to be successfully decoded exceeds the value of the parameter NBFDL, the RLT times out and the call is released by the MS, as indicated by block 55. If not, the process returns to block 53 and a next group of consecutive frames is decoded. As stated above, an alternative to the MS performing the tasks represented by the flow chart shown in FIG. 3 would be to have the MS report downlink FERs to the BSS, which would then make the determination as to whether the total number of frames that were unable to be successfully decoded exceeds the value of the parameter NBFDL. If so, the BSS would release the call. In the latter case, these tasks may be performed by the BSC of the BTS or by the BTS of the BSS. Another alternative would be to have the MSC make the determination and release the call if appropriate based on reporting by the MS.

As indicated above, the frames preferably are decoded in a FIFO order. For example, assuming that the value of NFDL is 20, the first group of frames to be processed will be frames N1-N20, where N corresponds to the frame number. The second group of frames to be processed will be frames N2-N22, the third group of frames will be frames N3-N23, and so on. For each group of frames processed, a FER will be determined for the group and a determination will be made as to the number of frames that were unable to be successfully decoded. If this number exceeds the value of parameter NBFDL, the RLT will time out.

Figure 4:
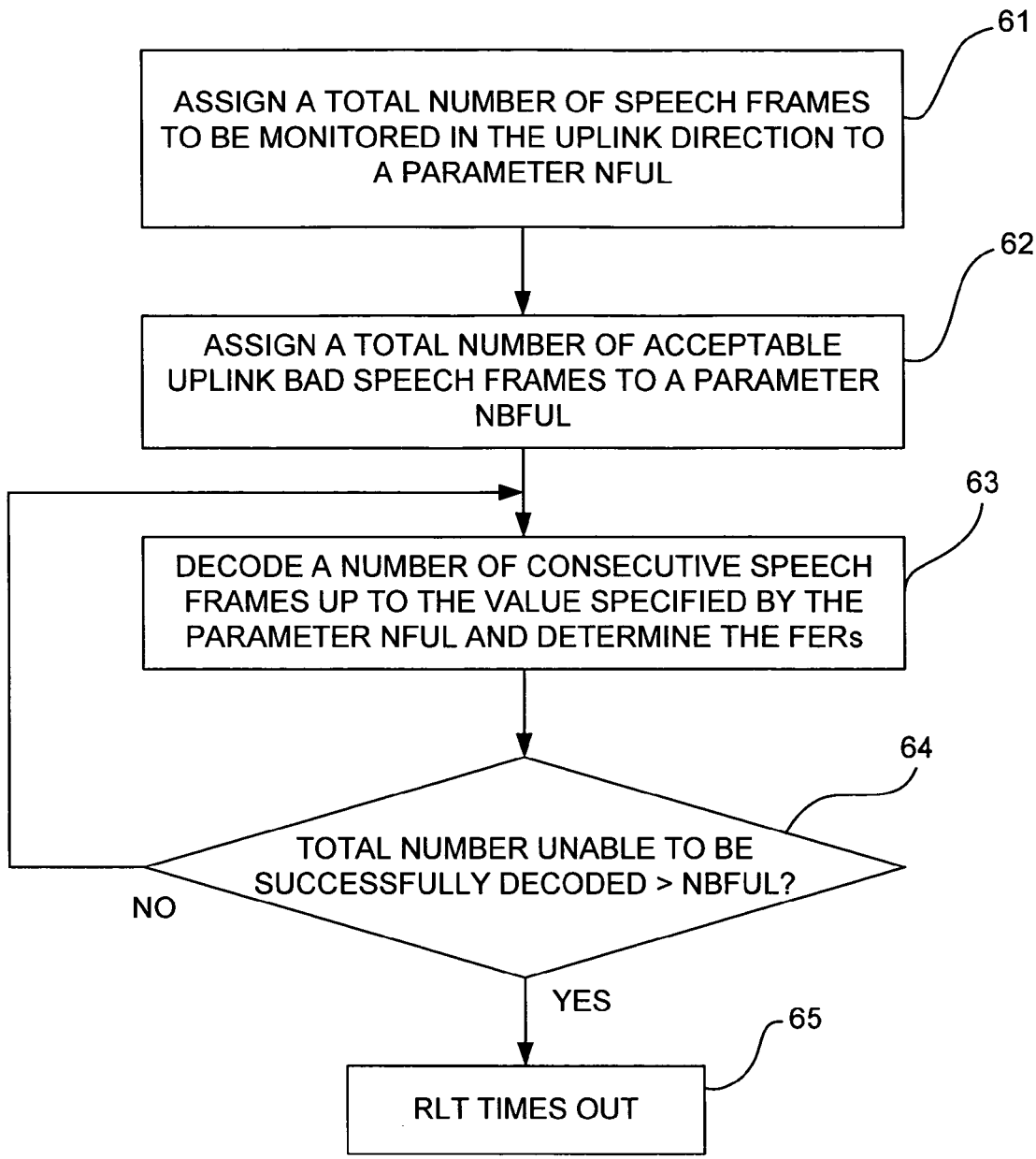
FIG. 4 is a flow chart of the method of the present invention in accordance with the preferred embodiment for monitoring frames in the uplink direction to determine whether a call should be released by the BS.

For the uplink direction, a total number of speech frames to be monitored in the uplink direction is assigned to a parameter, as indicated by block 61 in FIG. 4. This parameter will be called NFUL. A total number of acceptable uplink bad speech frames is assigned to a parameter, as indicated by block 62. This parameter will be called NBFUL. A number of consecutive speech frames equal to the value of the parameter NFUL are then decoded and a determination is made as to the FERs associated with each decoded frame, as indicated by block 63. Based on the FERs, a determination is then made as to whether the total number of speech frames that were unable to be successfully decoded exceeds the value of the parameter NBFUL, as indicated by block 64. If so, the RLT times out and the call is released by the BSS, as indicated by block 65. If not, the process returns to block 63 and a next group of consecutive frames is decoded. As in the downlink direction, in the uplink direction, the frames preferably are decoded in a FIFO order as described above with reference to FIG. 3. Typically, the determination is made by the BSS based on the most recently received frames, i.e., the frames contained in the FIFO or sliding window.

As indicated above, the determination as to whether or not the call should be released may be made at an associated MSC rather than at the BSS. If the determination is made at the BSS, it is typically made by the BSC of the BSS, although it could instead be made by the BTS of the BSS. The invention is not limited with respect to the location at which the tasks associated with RLT management are performed or with respect to the manner in which the corresponding functions are physically implemented.

Because the decisions made by the MS and BSS (or MSC) as to whether or not to release a call are based on the ability to successfully decode speech bits, the decisions are based solely on voice quality. Therefore, the problems mentioned above are avoided, such as problems relating to calls being released when there is intelligible voice quality but an insufficient number of SACCH frames successfully decoded. Likewise, problems relating calls being maintained when there is not intelligible voice quality are also avoided. It should be noted that the number of frames monitored in the downlink direction may be different from the number of frames monitored in the uplink direction. Thus, the value of the parameter NFUL does not necessarily equal the value of the parameter NFDL. Likewise, the value of the parameter NBFUL does not necessarily equal the value of the parameter NBFDL.

Another level of sophistication may be added to the methods described above with reference to FIGS. 3 and 4. This would include subdividing the number of frames equal to the value of parameters NFDL and NFUL into subgroups, assigning a parameter NBFDL and NBFUL, respectively, to each subgroup, and determining, for each subgroup, whether the number of frames in a subgroup that were unable to be successfully decoded exceeded the value specified by the applicable parameter NBFDL or NBFUL. Then, a determination would be made as to the number of subgroups that exceeded NBFUL for uplink (and likewise, NBFDL for downlink). For example, if the FER in at least 3 of 5 subgroups exceeded NBFUL for uplink (or NBFDL for downlink), a determination would be made that the call should be dropped.

In other words, the NFUL (or NFDL) interval could be subdivided into "T" number of intervals with each interval containing "N" frames. The FER threshold is then applied to each of the "T" intervals. Then, "X" out of "T" intervals are considered, where T≥X, and a determination is made as to whether the frames in the X intervals have a FER higher than a bad FER threshold "F." If at least X frames out of T frames have a FER in excess of "F," the call would be cleared and released. The parameter "F" represents an acceptable Frame Error Rate Threshold.

It should also be noted that the invention is not limited to monitoring voice quality but also applies to data frames communicated over circuit switched networks, in which case the decision as to whether to release a call would be based on the number of data frames successfully decoded. Also, the location at which the uplink bad frame monitoring mechanism can be implemented is not limited to any particular location or element in the network. For example, the uplink bad frame monitoring mechanism of the present invention may be located at any network element, including, for example, the BTS, the BSC, the MSC or any other network element.

Although the present invention has been described with reference to particular embodiments, the present invention is not limited to the embodiments described herein. Those skilled in the art will understand, in view of the description provided herein, that the present invention can be accomplished in a variety of ways. Also, a variety of modifications can be made to the embodiments described herein and all such modifications are within the scope of the present invention.

What is claimed is:

1. A method comprising:
    decoding, by a mobile station, a plurality of consecutive frames associated with a call, the plurality of consecutive frames comprising control channel frames and speech frames;
    determining, by the mobile station, a frame error rate for the speech frames of the plurality of consecutive frames, wherein determining the frame error rate for the speech frames comprises
        determining a number of frames downlink parameter, wherein the number of frames downlink parameter comprises a value equal to a number of the speech frames to be monitored, and
        determining a number of bad frames downlink parameter, wherein the number of bad frames downlink parameter comprises a value equal to a number of the speech frames unable to be decoded that is acceptable, wherein determining the frame error rate for the speech frames is based on the number of bad frames downlink parameter and the number of frames downlink parameter; and
    determining, by the mobile station based on the frame error rate for the speech frames of the plurality of consecutive frames and regardless of a frame error rate for the control channel frames of the plurality of consecutive frames, whether to release the call, wherein determining whether to release the call comprises
        determining whether the number of the speech frames unable to be decoded exceeds the number of bad frames downlink parameter, and
        if the number of the speech frames unable to be decoded exceeds the number of bad frames downlink parameter, releasing the call.

2. The method of claim 1, wherein determining the frame error rate for the speech frames comprises determining the frame error rate for the speech frames at a number of frames downlink interval.

3. A method comprising:
    decoding, by a mobile station, a plurality of consecutive frames associated with a call, the plurality of consecutive frames comprising control channel frames and speech frames;
    determining, by the mobile station, a frame error rate for the speech frames of the plurality of consecutive frames, wherein determining the frame error rate for the speech frames comprises
        determining a number of frames downlink parameter, wherein the number of frames downlink parameter comprises a value equal to a number of the speech frames to be monitored, and
        determining a number of bad frames downlink parameter, wherein the number of bad frames downlink parameter comprises a value equal to a number of the speech frames unable to be decoded that is acceptable, wherein determining the frame error rate for the speech frames is based on the number of bad frames downlink parameter and the number of frames downlink parameter; and
    determining, by the mobile station based on the frame error rate for the speech frames of the plurality of consecutive frames and regardless of a frame error rate for the control channel frames of the plurality of consecutive frames, whether to release the call, wherein determining whether to release the call comprises
        decoding a number of the speech frames equal to the number of frames downlink parameter,
        determining, from the speech frames decoded, a number of the speech frames unable to be decoded,
        determining whether the number of the speech frames unable to be decoded exceeds the number of bad frames downlink parameter, and
        if the number of the speech frames unable to be decoded exceeds the number of bad frames downlink parameter, releasing the call.

4. The method of claim 3, wherein determining the frame error rate for the speech frames comprises determining the frame error rate for the speech frames at a number of frames uplink interval.

5. A method comprising:
    decoding, by a base station system, a plurality of consecutive frames associated with a call, the plurality of consecutive frames comprising control channel frames and speech frames;
    determining, by the base station system, a frame error rate for the speech frames of the plurality of consecutive frames, wherein determining the frame error rate for the speech frames comprises:
        determining a number of frames uplink parameter, wherein the number of frames uplink parameter comprises a value equal to a number of the speech frames to be monitored, and
        determining a number of bad frames uplink parameter, wherein the number of bad frames uplink parameter comprises a value equal to a number of the speech frames unable to be decoded that is acceptable, wherein determining the frame error rate for the speech frames is based on the number of bad frames uplink parameter and the number of frames uplink parameter; and determining, by the base station system based on the frame error rate for the speech frames of the plurality of consecutive frames and regardless of a frame error rate for the control channel frames of the plurality of consecutive frames, whether to release the call, wherein determining whether to release the call comprises determining whether the number of the speech frames unable to be decoded exceeds the number of bad frames uplink parameter, and if the number of the speech frames unable to be decoded exceeds the number of bad frames uplink parameter, releasing the call.

6. The method of claim 5, wherein determining the frame error rate for the speech frames comprises determining the frame error rate for the speech frames at a number of frames uplink interval.

7. A method comprising:

decoding, by a base station system, a plurality of consecutive frames associated with a call, the plurality of consecutive frames comprising control channel frames and speech frames;

determining, by the base station system, a frame error rate for the speech frames of the plurality of consecutive frames, wherein determining the frame error rate for the speech frames comprises:

determining a number of frames uplink parameter, wherein the number of frames uplink parameter comprises a value equal to a number of the speech frames to be monitored, and determining a number of bad frames uplink parameter, wherein the number of bad frames uplink parameter comprises a value equal to a number of the speech frames unable to be decoded that is acceptable, wherein determining the frame error rate for the speech frames is based on the number of bad frames uplink parameter and the number of frames uplink parameter; and determining, by the base station system based on the frame error rate for the speech frames of the plurality of consecutive frames and regardless of a frame error rate for the control channel frames of the plurality of consecutive frames, whether to release the call, wherein determining whether to release the call comprises decoding a number of the speech frames equal to the number of frames uplink parameter, determining, from the speech frames decoded, a number of the speech frames unable to be decoded, determining whether the number of the speech frames unable to be decoded exceeds the number of bad frames uplink parameter, and if the number of the speech frames unable to be decoded exceeds the number of bad frames uplink parameter, releasing the call.

8. The method of claim 7, wherein determining the frame error rate for the speech frames comprises determining the frame error rate for the speech frames at a number of frames downlink interval.

9. A method comprising:

decoding, by a mobile station, a plurality of consecutive frames associated with a call, the plurality of consecutive frames comprising control channel frames and data frames;

determining, by the mobile station, a frame error rate for the data frames of the plurality of consecutive frames, wherein determining the frame error rate for the data frames comprises determining a number of frames downlink parameter, wherein the number of frames downlink parameter comprises a value equal to a number of the data frames to be monitored, and determining a number of bad frames downlink parameter, wherein the number of bad frames downlink parameter comprises a value equal to a number of the data frames unable to be decoded that is acceptable, wherein determining the frame error rate for the data frames is based on the number of bad frames downlink parameter and the number of frames downlink parameter; and determining, by the mobile station based on the frame error rate for the data frames of the plurality of consecutive frames and regardless of a frame error rate for the control channel frames of the plurality of consecutive frames, whether to release the call, wherein determining whether to release the call comprises determining whether the number of the data frames unable to be decoded exceeds the number of bad frames downlink parameter, and if the number of the data frames unable to be decode exceeds the number of bad frames downlink parameter, releasing the call.

10. The method of claim 9, wherein determining the frame error rate for the data frames comprises determining the frame error rate for the data frames at a number of frames downlink interval.

11. A method comprising:

decoding, by a mobile station, a plurality of consecutive frames associated with a call, the plurality of consecutive frames comprising control channel frames and data frames;

determining, by the mobile station, a frame error rate for the data frames of the plurality of consecutive frames, wherein determining the frame error rate for the data frames comprises determining a number of frames downlink parameter, wherein the number of frames downlink parameter comprises a value equal to a number of the data frames to be monitored, and determining a number of bad frames downlink parameter, wherein the number of bad frames downlink parameter comprises a value equal to a number of the data frames unable to be decoded that is acceptable, wherein determining the frame error rate for the data frames is based on the number of bad frames downlink parameter and the number of frames downlink parameter; and determining, by the mobile station based on the frame error rate for the data frames of the plurality of consecutive frames and regardless of a frame error rate for the control channel frames of the plurality of consecutive frames, whether to release the call, wherein determining whether to release the call comprises decoding a number of the data frames equal to the number of frames downlink parameter, determining, from the data frames decoded, a number of the data frames unable to be decoded, determining whether the number of the data frames unable to be decoded exceeds the number of bad frames downlink parameter, and if the number of the data frames unable to be decode exceeds the number of bad frames downlink parameter, releasing the call.

12. The method of claim 11, wherein determining the frame error rate for the data frames comprises determining the frame error rate for the data frames at a number of frames downlink interval.

13. A method comprising:
decoding, by a base station system, a plurality of consecutive frames associated with a call, the plurality of consecutive frames comprising control channel frames and data frames;
determining, by the base station system, a frame error rate for the data frames of the plurality of consecutive frames, wherein determining the frame error rate for the data frames comprises
determining a number of frames uplink parameter, wherein the number of frames uplink parameter comprises a value equal to a number of the data frames to be monitored, and
determining a number of bad frames uplink parameter, wherein the number of bad frames uplink parameter comprises a value equal to a number of the data frames unable to be decoded that is acceptable, wherein determining the frame error rate for the data frames is based on the number of bad frames uplink parameter and the number of frames uplink parameter; and
determining, by the base station system based on the frame error rate for the data frames of the plurality of consecutive frames and regardless of a frame error rate for the control channel frames of the plurality of consecutive frames, whether to release the call, wherein determining whether to release the call comprises
determining whether the number of the data frames unable to be decoded exceeds the number of bad frames uplink parameter, and
if the number of the data frames unable to be decoded exceeds the number of bad frames uplink parameter, releasing the call.

14. The method of claim 13, wherein determining the frame error rate for the data frames comprises determining the frame error rate for the data frames at a number of frames uplink interval.

15. A method comprising:
decoding, by a base station system, a plurality of consecutive frames associated with a call, the plurality of consecutive frames comprising control channel frames and data frames;
determining, by the base station system, a frame error rate for the data frames of the plurality of consecutive frames, wherein determining the frame error rate for the data frames comprises
determining a number of frames uplink parameter, wherein the number of frames uplink parameter comprises a value equal to a number of the data frames to be monitored, and
determining a number of bad frames uplink parameter, wherein the number of bad frames uplink parameter comprises a value equal to a number of the data frames unable to be decoded that is acceptable, wherein determining the frame error rate for the data frames is based on the number of bad frames uplink parameter and the number of frames uplink parameter; and
determining, by the base station system based on the frame error rate for the data frames of the plurality of consecutive frames and regardless of a frame error rate for the control channel frames of the plurality of consecutive frames, whether to release the call, wherein determining whether to release the call comprises
decoding a number of the data frames equal to the number of frames uplink parameter,
determining, from the data frames decoded, a number of the data frames unable to be decoded,
determining whether the number of the data frames unable to be decoded exceeds the number of bad frames uplink parameter, and
if the number of the data frames unable to be decoded exceeds the number of bad frames uplink parameter, releasing the call.

16. The method of claim 15, wherein determining the frame error rate for the data frames comprises determining the frame error rate for the data frames at a number of frames uplink interval.

17. A method comprising:
decoding, by a mobile switching center, a plurality of consecutive frames associated with a call, the plurality of consecutive frames comprising control channel frames and speech frames;
determining, by the mobile switching center, a frame error rate for the speech frames of the plurality of consecutive frames, wherein determining the frame error rate for the speech frames comprises
determining a number of frames downlink parameter, wherein the number of frames downlink parameter comprises a value equal to a number of the speech frames to be monitored, and
determining a number of bad frames downlink parameter, wherein the number of bad frames downlink parameter comprises a value equal to a number of speech frames unable to be decoded that is acceptable, wherein determining the frame error rate for the speech frames is based on the number of bad frames downlink parameter and the number of bad frames downlink parameter; and
determining, by the mobile switching center based on the frame error rate for the speech frames of the plurality of consecutive frames and regardless of a frame error rate for the control channel frames of the plurality of consecutive frames, whether to release the call, wherein determining whether to release the call comprises
determining whether the number of the speech frames unable to be decoded exceeds the number of bad frames downlink parameter, and
if the number of the speech frames unable to be decoded exceeds the number of bad frames downlink parameter, releasing the call.

18. The method of claim 17, wherein determining the frame error rate for the speech frames comprises determining the frame error rate for the speech frames at a number of frames downlink interval.

19. A method comprising:
decoding, by a mobile switching center, a plurality of consecutive frames associated with a call, the plurality of consecutive frames comprising control channel frames and speech frames;
determining, by the mobile switching center, a frame error rate for the speech frames of the plurality of consecutive frames, wherein determining the frame error rate for the speech frames comprises
determining a number of frames downlink parameter, wherein the number of frames downlink parameter comprises a value equal to a number of the speech frames to be monitored, and determining a number of bad frames downlink parameter, wherein the number of bad frames downlink parameter comprises a value equal to a number of the speech frames unable to be decoded that is acceptable, wherein determining the frame error rate for the speech frames is based on the number of bad frames downlink parameter and the number of bad frames downlink parameter; and determining, by the mobile switching center based on the frame error rate for the speech frames of the plurality of consecutive frames and regardless of a frame error rate for the control channel frames of the plurality of consecutive frames, whether to release the call, wherein determining whether to release the call comprises decoding a number of the speech frames equal to the number of frames downlink parameter, determining, from the speech frames decoded, a number of the speech frames unable to be decoded, determining whether the number of the speech frames unable to be decoded exceeds the number of bad frames downlink parameter, and if the number of the speech frames unable to be decoded exceeds the number of bad frames downlink parameter, releasing the call.

20. The method of claim 19, wherein determining the frame error rate for the speech frames comprises determining the frame error rate for the speech frames at a number of frames downlink interval.

* * * * *